Figure 1:
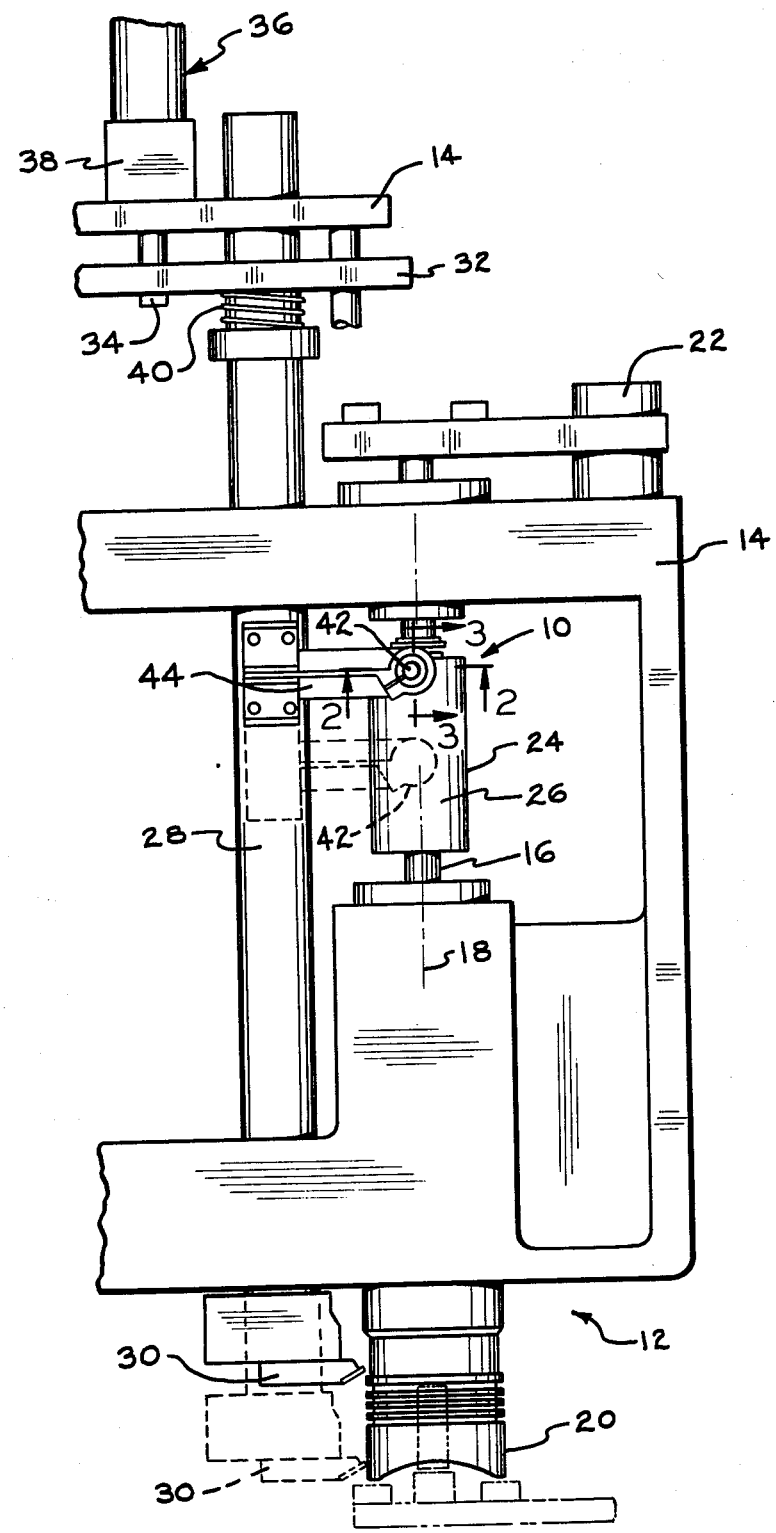

United States Patent [19]
Sattler

[11] 4,085,634
[45] Apr. 25, 1978

[54] CAM AND CAM FOLLOWER ASSEMBLY

[75] Inventor: Robert I. Sattler, Grosse Pointe Shores, Mich.

[73] Assignee: LaSalle Machine Tool, Inc., Warren, Mich.

[21] Appl. No.: 479,046

[22] Filed: Jun. 13, 1974

[51] Int. Cl.² .................. B23B 3/28; F16H 53/06
[52] U.S. Cl. .......................................... 82/19; 74/569
[58] Field of Search .................. 82/19, 11, 33; 74/569

[56] References Cited
U.S. PATENT DOCUMENTS

| | | | |
|---|---|---|---|
| 1,733,594 | 10/1929 | Greer et al. | 82/33 |
| 1,891,102 | 12/1932 | Marquis | 82/33 |
| 2,343,914 | 3/1944 | Lloyd | 82/19 X |
| 2,421,655 | 6/1947 | Seyferth et al. | 74/569 |
| 3,181,399 | 5/1965 | Jenkins | 82/11 |

FOREIGN PATENT DOCUMENTS 1,449,808  7/1966  France .................................. 82/19

OTHER PUBLICATIONS

Mechanics of Machinery, C. W. Ham and E. J. Crane, 3rd Edition, McGraw-Hill Book Co. Inc., 1948, p. 53.

*Primary Examiner*—Leonidas Vlachos
*Attorney, Agent, or Firm*—Olsen and Stephenson

[57] ABSTRACT

Cam and cam follower apparatus in which the cam follower comprises a body having a cavity at one end and a diamond material filling the cavity. The cam member is substantially cylindrical and has a longitudinal axis about which the cam member is curved. The cam follower has a diamond material working surface which is curved in planes parallel to the longitudinal axis of the cam and is maintained in following engagement with the cam. As a result, the cam and follower have intersecting arcuate surfaces providing for substantially point contact between the surfaces, with the point being located on the diamond material. This arrangement provides for improved efficiency in the operation of the cam and the cam follower because it materially reduces wear of the follower. Thus, increased accuracy in the shape and size of the products being formed can be maintained. The hardness of the diamond filling material insures this improved efficiency.

3 Claims, 3 Drawing Figures

CAM AND CAM FOLLOWER ASSEMBLY

BACKGROUND OF THE INVENTION

Cam and cam follower assemblies are commonly used in duplicating apparatus wherein the shape of the cam determines the final shape of work pieces. An example of such apparatus is the piston turning machine shown in co-pending application Ser. No. 389,483 filed Aug. 20, 1973, now U.S. Pat. No. 3,869,947, and owned by the assignee of this application. Operation of machinery of this general type is plagued by the problem of wear of the cam follower adversely affecting the accuracy of the machine and necessitating frequent changes of the follower. This tendency of the follower to wear is due in part to the fact that the cam follower is always moving and is subject to heavy loading in order to maintain it in engagement with the cam. In the past, attempts have been made to prolong the life of the follower by forming it of a variety of different materials such as metal carbide, plastic fibers, graphite impregnated formica, bronze and stainless steel. All of these materials are satisfactory but they do not meet the objective of a long service life. The object of the present invention, therefore, is to provide an improved apparatus which includes a cam follower constructed so that it can be maintained over a prolonged service life without wear.

SUMMARY OF THE INVENTION

The apparatus of this invention is particularly useful in a piston turning machine wherein a cam is used to determine the final shape of a piston being turned. The turning tool for the piston is connected to a cam follower which follows the cam that sets the size and shape of the piston. A spring urges the follower into engagement with the cam so as to achieve a precise control on the final shape of the piston according to the shape of the cam. The cam follower comprises a body having a cavity at one end and a diamond material filling the cavity. The diamond material can either be natural or synthetic in form, can be a one piece crystal or can be a plurality of crystals molded in place. In any event, the principal virtue of the diamond material is its extreme hardness and resultant resistance to wear. Importantly, the diamond material is shaped so that it has an arcuate working surface engaged with the cam. The working surface is curved in planes parallel to the longitudinal axis of the cam. This arrangement provides for intersecting arcuate surfaces on the cam and cam follower which insures a substantially point contact between the cam and follower. This point of contact is located on the working surface of the diamond material thereby insuring that the normal wear between cam and follower will be effectively resisted by the diamond material. As a result, the usable service life of the follower in this invention is many times greater than the service life of the followers that have been heretofore commonly used. This enables the maintenance of a more accurate shape and size of the work pieces over a period of time.

Figure 3:
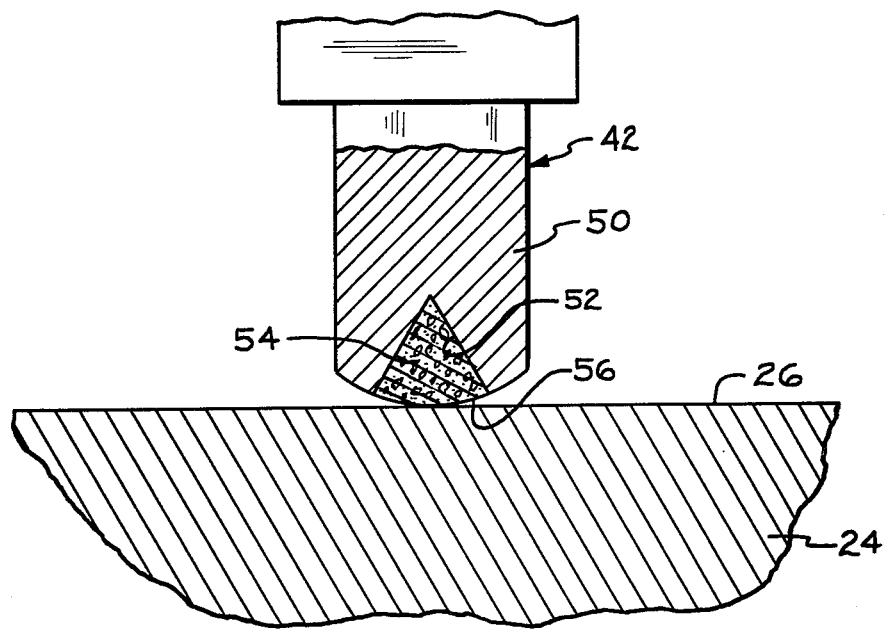
Figure 2:
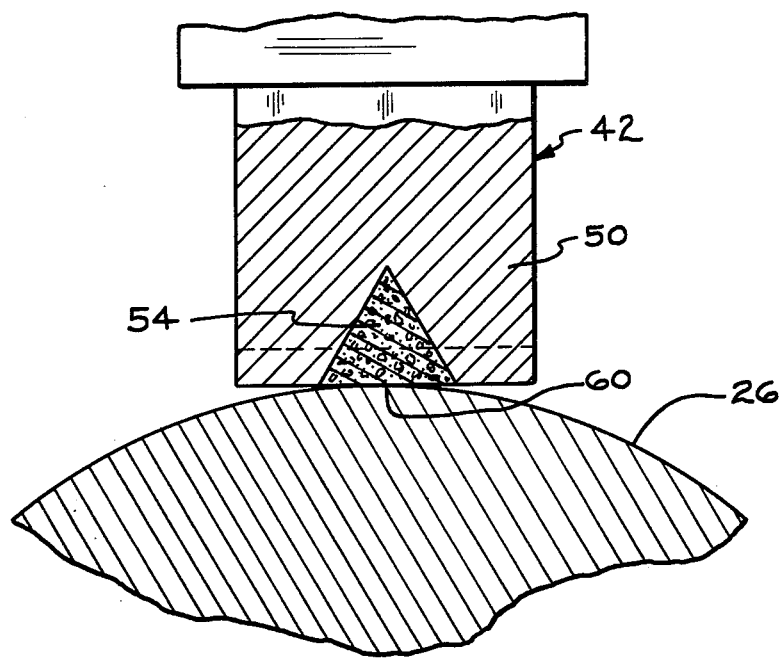

Further objects, features and advantages of this invention will become apparent from a consideration of the following description, the appended claims, and the accompanying drawing in which:

FIG. 1 is a side elevational view of a piston turning machine embodying the cam and cam follower assembly of this invention; and FIGS. 2 and 3 are fragmentary detail sectional views of the cam and cam follower assembly as seen from the lines 2—2 and 3—3, respectively, in FIG. 1.

With reference to the drawing, the cam and cam follower assembly of this invention, indicated generally at 10, is illustrated in FIG. 1 embodied in a piston turning machine 12. The machine 12 is described in detail in the aforementioned co-pending application. Thus, only a summary of the machine structure is included herein. The machine 12 includes a main frame 14 on which an elongated shaft structure 16 is mounted for rotation about an axis 18 so as to rotate a piston 20 about an axis coincident with the axis 18. A rotary drive motor 22 is provided for rotating the shaft structure 16 about the axis 18, and interposed in the shaft structure 16 between the ends thereof, is a generally cylindrical cam 24 having an external surface 26 curved about the axis 18. The surface 26 is configured to correspond to the final shape desired for the piston 20.

Slideably supported on the main frame 14 at a position parallel to the axis 18 is a reciprocal tool bar 28. A turning tool 30 is mounted on one end of the tool bar 28 and the opposite end of the tool bar 28 is secured to a bar 32 which is in turn mounted on the piston rod 34 for a fluid actuated cylinder assembly 36 that has its cylinder 38 mounted on the frame 14. When the piston and cylinder assembly 36 is actuated to retract the piston rod 34, the tool bar 28 is moved upwardly so as to move the tool 30 to the solid line position shown in FIG. 1. When the assembly 36 is actuated to extend the piston rod 34, the tool 30 is advanced along the piston 20 to the final position shown in broken lines in FIG. 1. During such movement, a torsion spring 40 which extends between the mounting bar 32 and the tool bar 28 urges the tool bar in a direction to maintain a cam follower 42 in engagement with the cam 24. The follower 42 (FIGS. 2 and 3) is mounted on a support arm 44 carried by the tool bar 28. By virtue of the rotatable mounting of the tool bar 28 on the frame 14, movement of the cam follower 42 on the cam surface 26 causes movement of the turning tool 30 in a direction radially of the piston 20.

As shown in FIGS. 2 and 3, the follower 42 consists of a body 50 formed at one end with a cavity 52 which is illustrated as being of conical shape having a relatively straight side wall but which can also be much more irregular in shape only approximately a cone shape. A diamond material 54 fills the cavity 52. The diamond material 54 can take several forms. In all forms, the material is shaped to provide an arcuate surface 56 (FIG. 3) which constitutes a working surface for the follower 42. The diamond material 54 can be a single natural diamond crystal which is brazed into the cavity 52. The material 54 can also be pieces or particles of natural diamond crystals or artificial diamond pieces held together by a suitable binder. In all cases, the diamond material 54 is of a substantially higher hardness than any other available material. As a result, the useful service life of the follower 42 is many times greater than the service life available from followers made from a different material.

As shown in FIGS. 2 and 3, the arcuate surfaces 26 and 56 on the cam 24 and the follower 42 provide for a point contact between the cam 24 and the follower 42. This point of contact, indicated at 60 in FIG. 2, is located on the diamond surface 56. For this reason surface 56 is sometimes referred to herein as the "working surface." Thus, long wear of the follower 42 is assured. Because the surface 26 of the cam 24 is not a regular cylindrical surface, the cam follower 42 will move on the surface 26. As a result, the point 60 may range over an area on the surface 56. However, the point 60 will at all times be located on the surface 56.

By virtue of the shaping of the diamond material 54 so as to avoid sharp points, the danger of breaking of the material 54 is avoided to thus further enhance the potential useful service life of the follower 42.

In the use of the turning machine 12, the follower 42 follows the shape of the cam surface 26 so as to accurately determine the final shape of the piston 20. Since the follower 42 has a very high resistance to wear, it is possible to maintain very accurate shape and size specifications for pistons 20 over a prolonged period of time without replacing the follower 42. In a preferred embodiment of the invention, the cam 24 is formed of a long wearing steel alloy.

What is claimed is:

1. In apparatus which includes a substantially cylindrical cam having a longitudinal axis and a cam follower engaged with and movable longitudinally of said cam, said cam follower comprising a body having a cavity at one end and a diamond material filling said cavity and having an arcuate working surface, said working surface being curved solely in planes parallel to the longitudinal axis of said cam and to each other and one of which planes intersects said axis, said working surface being substantially straight in a plane substantially perpendicular to said planes that are parallel to the longitudinal axis of said cam, whereby said cam and follower have arcuate surfaces which are tangent to each other and are curved in planes that are substantially perpendicular to each other thereby providing for substantially point contact between said surfaces, said point being located on said working surface.

2. Apparatus according to claim 1 further including means for moving said follower longitudinally of said cam.

3. In a piston turning machine, elongated rotatable shaft means having an axis, means for supporting a piston to be turned on one end of said shaft means, a cam member intermediate the ends of said shaft means, said cam member having an external surface curved about said axis, a support bar mounted for movement substantially parallel to said axis, a turning tool secured to said bar and extending toward said axis for engagement with a piston on said support means, a cam follower secured to said bar and engaged with said cam member, means urging said follower into engagement with said cam member, said cam follower comprising a body having a cavity at one end and a diamond material filling said cavity and having an arcuate working surface engaged with said cam member surface, said diamond material working surface being curved solely in planes that are parallel to the longitudinal axis of said cam and are also parallel to each other and one of which planes intersects said axis, said working surface being substantially straight in a plane substantially perpendicular to said planes that are parallel to the longitudinal axis of said cam, whereby said cam and follower have arcuate surfaces which are tangent to each other and are curved in planes that are substantially perpendicular to each other thereby providing for substantially point contact between said surfaces, said point being located on the arcuate surface of said diamond material.

* * * * *